US012467068B2

(12) United States Patent
Dastager et al.

(10) Patent No.: US 12,467,068 B2
(45) Date of Patent: Nov. 11, 2025

(54) PROCESS FOR THE PRODUCTION AND RECOVERY OF BIO-SURFACTANT FROM *BACILLUS* SP. MCC0156

(71) Applicant: COUNCIL OF SCIENTIFIC & INDUSTRIAL RESEARCH, New Delhi (IN)

(72) Inventors: Syed Gulam Dastager, Pune (IN); Hari Ram, Pune (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 1097 days.

(21) Appl. No.: 17/429,336

(22) PCT Filed: Feb. 4, 2020

(86) PCT No.: PCT/IN2020/050105
§ 371 (c)(1),
(2) Date: Aug. 7, 2021

(87) PCT Pub. No.: WO2020/161735
PCT Pub. Date: Aug. 13, 2020

(65) Prior Publication Data
US 2022/0193739 A1 Jun. 23, 2022

(30) Foreign Application Priority Data
Feb. 8, 2019 (IN) .............................. 201911005440

(51) Int. Cl.
*C12P 7/04* (2006.01)
*C12N 1/02* (2006.01)
*C12N 1/20* (2006.01)
*C12P 1/04* (2006.01)
*C12P 5/02* (2006.01)
*B09C 1/10* (2006.01)

(52) U.S. Cl.
CPC ................ *C12P 5/026* (2013.01); *C12N 1/02* (2013.01); *C12N 1/20* (2013.01); *B09C 1/10* (2013.01)

(58) Field of Classification Search
CPC .................................. C12P 5/026; C12N 1/20
See application file for complete search history.

(56) References Cited

U.S. PATENT DOCUMENTS

2016/0237467 A1 8/2016 Lu et al.

FOREIGN PATENT DOCUMENTS

IN 35/DEL/2013 4/2016
WO 2009/085278 A1 7/2009

OTHER PUBLICATIONS

Ram. A novel fatty alkene from marine bacteria: A thermo stable biosurfactant and its applications. Journal of Hazardous Materials, vol. 380, 2019.*

(Continued)

*Primary Examiner* — Yong D Pak
(74) *Attorney, Agent, or Firm* — Maschoff Brennan

(57) ABSTRACT

The present invention relates to a process for the production and recovery of a bio-surfactant extract from *Bacillus* sp. MCC0156. Further, the present invention relates to a thermostable bio-surfactant extract consisting of 1-Pentanonacontene and 3-hydroxy-16-methylheptadecanoic acid with excellent emulsification and oil displacement activity for applications in agriculture and oil recovery.

7 Claims, 7 Drawing Sheets

(56) References Cited

OTHER PUBLICATIONS

Ram. A novel fatty alkene from marine bacteria: A thermo stable biosurfactant and its applications. J Hazard Mater. Dec. 15, 2019; 380:120868.*

Pereira et al., "Optimization and characterization of biosurfactant production by Bacillus subtillis isolates towards microbial enhanced oil recovery applications" Fuel, Feb. 28, 2013.

Balan et al., "Aneurinifactin, a new lipopeptide biosurfactant produced by a marine Aneurinibacillus aneurinilyticus SBP-11 isolated from Gulf of Mannar: Purification, characterization and its biological evaluation", Microbiological Research, May 2, 2016.

Barakat et al., "Biosurfactant production by haloalkaliphilic Bacillus strains isolated from Red Sea, Egypt", Egyptian Journal of Aquatic Research, Jun. 16, 2017.

* cited by examiner

PROCESS FOR THE PRODUCTION AND RECOVERY OF BIO-SURFACTANT FROM BACILLUS SP. MCC0156

FIELD OF THE INVENTION

The present invention relates to a process for the production and recovery of a bio-surfactant from *Bacillus* sp. MCC0156. Further, the present invention relates to a thermostable bio-surfactant extract consisting of 1-Pentanonacontene and 3-hydroxy-16-methyl heptadecanoic acid with excellent emulsification and oil displacement activity for applications in agriculture and oil recovery.

BACKGROUND OF THE INVENTION

Surfactants find applications in many industries such as organic chemicals, petroleum, petrochemicals, mining, metallurgy (for bioleaching), agrochemicals, fertilizers, foods, beverages, cosmetics, pharmaceuticals and few others. They are used as emulsifiers as well as de-emulsifiers, wetting agents, foaming agents, spreading agents, functional food ingredients and detergents. Their ability to reduce interfacial surface tension allows them to play a very important role in oil recovery and bioremediation of heavy crude oil.

Surfactants may be purely chemical or may be produced by microorganisms. These surface-active biomolecules have attracted wide interest because they possess properties such as specificity, low toxicity and relative ease of preparation. Bio surfactants have advantages over their synthetic counterpart as they are eco-friendly and biodegradable and exhibit antibacterial, antifungal, insecticidal, anti-biofilm and efficient wetting ability and wide range of industrial applications. But producing bio surfactants from a cheap and simple substrate involving a microorganism remains a challenge in this field of technology.

Numerous bacterial strains of marine origin have been reported for bio-surfactants with high foaming, emulsification and surface reduction capabilities. However, these bacterial strains have namely been known to produce lipopeptide surfactants.

US Patent Publication No. 2016/0237467 which discloses a surfactin produced from *Bacillus subtilis* ssp. containing sfp gene (lipopeptide biosurfactants produced by fermentation) by solid state fermentation. However, employing solid state fermentation or liquid fermentation results in exhaustion of several resources and use of multiple medium ingredients over an extended duration of time.

Indian Patent Application No. 35/DEL/2013 which discloses a method for the production of bio-surfactant by *Bacillus thuringiensis serovar thuringiensis* having a high surface tension of 48.00 (N/m). It is important to note here that the bio-surfactant produced by the aforementioned application has high surface tension which is not conducive for use in industrial applications and bioremediation.

PCT Publication No. WO2009/085278 which discloses the discovery of a novel gene, or β80, encoding an olefin-producing enzyme, i.e. a polypeptide having fatty acid decarboxylase activity. WO'278 further specifies recombinant DNA technology involving polynucleotide/gene (encoding an olefin producing enzyme) isolated mainly from *Jeotgalicoccus*, and *Corynebacterium, Kocuria, Methylobacterium*, or *Bacillus*. It is clear the WO'278 employs recombinant DNA technology to lead to the formation of olefins, which proves to be expensive. Further, WO'278 fails to provide detailed studies in relation to the recovery of a thermostable bio surfactant from bacterial species with excellent emulsification, oil displacement activity and enhanced oil recovery.

Thus, keeping in view the hitherto reported prior art, it may be summarized that there is a long standing need in the art to provide a bio surfactant of microbial origin which is thermostable, efficiently active over a range of physical parameters, is produced by an economically viable process, and is an industrially applicable bio surfactant, which can be used for the diverse applications envisaged for a surfactant with reduced toxic effects on the environment and biodegradabiltiy and also a process for the preparation thereof.

OBJECTS OF THE INVENTION

The main object of the present invention is to provide an economical process for the production and recovery of a bio-surfactant extract from microbial origin.

Another object of the present invention is to provide a process resulting in high yield of thermo stable bio-surfactant from microbial origin using a cost-efficient culture medium in a relatively short incubation period.

Yet another object of the present invention is to provide a thermo stable bio-surfactant extract from microbial origin with excellent emulsification and oil displacement activity for applications in agriculture, surface tension for laundry applications and oil recovery.

It is a further object of the present invention to provide a thermo stable bio-surfactant mixture with physiological stability over a wide range of physical parameters.

SUMMARY OF THE INVENTION

The present invention relates to a process for the production and recovery of a bio-surfactant extract from *Bacillus* sp. MCC0156. Further, the present invention relates to a thermo stable bio-surfactant extract consisting of 1-Pentanonacontene and 3-hydroxy-16-methylheptadecanoic acid with excellent emulsification and oil displacement activity for applications in agriculture and oil recovery.

In an aspect, the present invention provides a process for the production and recovery of a bio surfactant mixture consisting of 1-Pentanonacontene and 3-Hydroxy-16-methylheptadecanoic acid from *Bacillus* sp. MCC0156 comprises the following steps of:
  a) inoculating inoculum from overnight grown culture of *Bacillus* sp. MCC0156 in a medium consisting of yeast extract in water;
  b) obtaining cell free supernatant by centrifuging;
  c) regulating the pH of supernatant of step (b) to 2.0 using acid and storing overnight at 4° C. to obtain an acid precipitated pellet by centrifugation and dissolving in water adjusted to pH 8;
  d) repeating step of acid precipitation of step (c) at least two times to remove impurities from the medium; and
  e) freeze drying the acid precipitated pellet by chromatography to obtain a lyophilized bio surfactant mixture consisting 1-Pentanonacontene and 3-Hydroxy-16-methyl heptadecanoic acid.

In another aspect, the present invention provides a bio-surfactant extract recovered from the aforementioned process consisting of 1-Pentanonacontene and 3-Hydroxy-16-methyl heptadecanoic acid.

The present invention provides a crude bio-surfactant mixture from *Bacillus* sp. MCC0156 using economical raw material with thermostability up to 160° C., over a wide pH range of 6-12 and 50% NaCl concentration found advantages over the previous reported bio-surfactants with wide application potential.

Advantageously, the bio-surfactant produced and recovered from *Bacillus* sp. MCC0156 possesses a contact angle reduction efficiency which is used to enhance wetting ability of pesticide droplets on plant leaves. Further, the toxicity and biodegradability prospect of bio-surfactants produced by *Bacillus* sp. MCC0156 with physiological stability over wide range of environmental condition was found consistent with the previous reports on other bio-surfactants.

The *Bacillus* sp. MCC0156 of the present disclosure was deposited under the provisions of the Budapest Treaty on the International Recognition of the Deposit of Microorganisms for the Purpose of Patent Procedure with International Depositary Authority NCMR-NCCS at Sai Trinity Complex, Sus Road, Pashan, Pune-411021, Maharashtra, India on Jan. 3, 2019, and was given the accession number MCC 0156. The viability of the microorganism was tested on Jan. 25, 2019, and determined to be viable.

BRIEF DESCRIPTION OF THE ACCOMPANYING DRAWINGS

FIG. 1 depicts Phylogenetic tree of 16S rRNA gene sequences of marine *Bacillus* sp. MCC0156 with its accessed phylogenetic neighbours constructed using the neighbour joining method. The statistical significance was determined using 1000 bootstrap values of MEGA 7.0 software. Internal images (A) strain MCC0156 (B) FE-SEM image.

Figure 8:
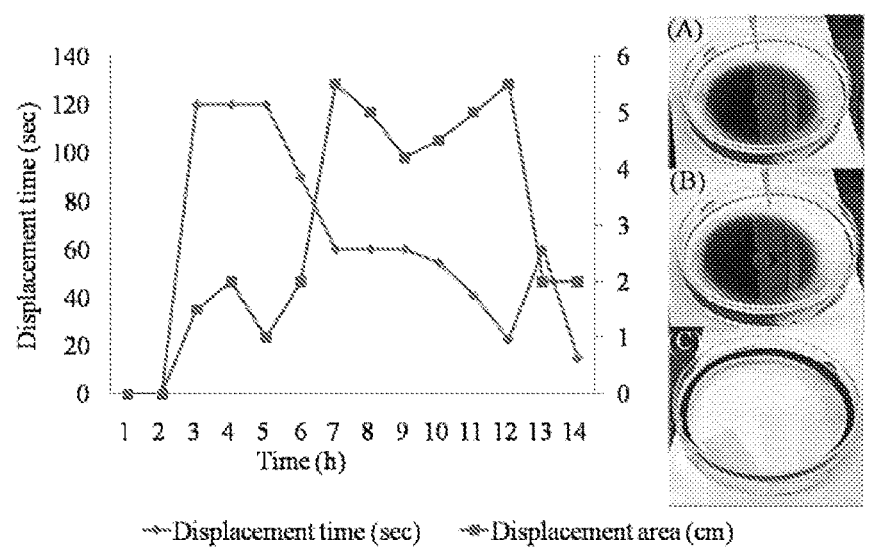

FIG. 8 depicts Oil displacement assay of cell free supernatant of *Bacillus* sp. MCC0156 using used lubricant oil layer on distilled water and displacement area with reference to displacement time (seconds) was determined. Internal images represent the (A) Thick layer of ULO on water (B) addition of crude BS (C) Oil dispersion.

Figure 9:
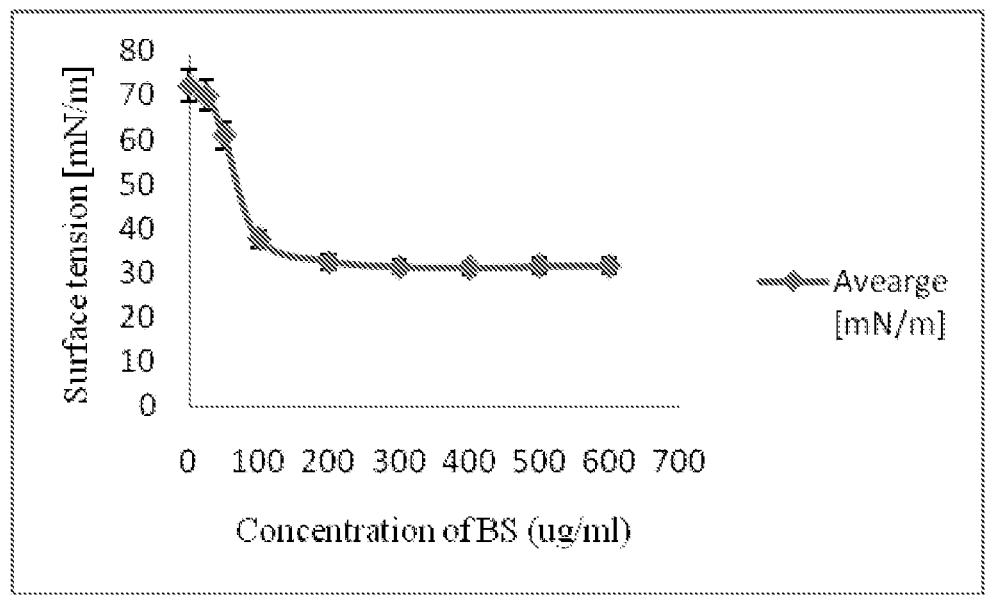

FIG. 9 depicts Surface tension of distilled water with different concentration of crude biosurfactant from *Bacillus* sp. MCC0156.

Figure 10:
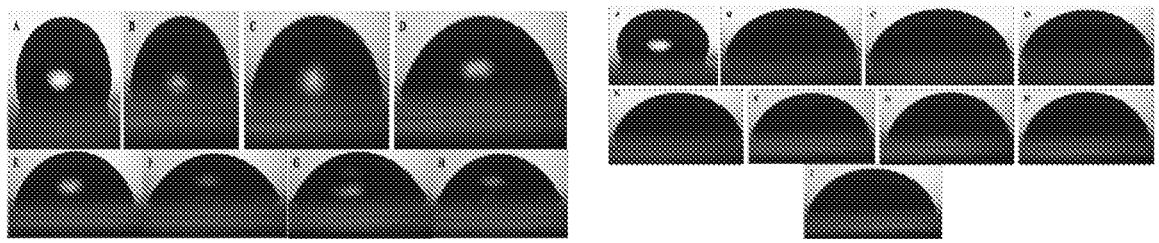

FIG. 10 depicts (A). Contact angle of (A) distilled water and cell free supernatant of sample 1 h (B), 3.5 h (C), 5 h (D), 9 h (E), 12 h (F), 19 h (G), 36 h (H) on Teflon and (B) Contact angle of distilled water (A), distilled water with 2% pesticide (B) and cell free supernatant of sample 1 h (C), 3.5 h (D), 5 h (E), 9 h (F), 11 h (G), 19 h (H), 36 h (I) on Teflon.

Figure 11A:
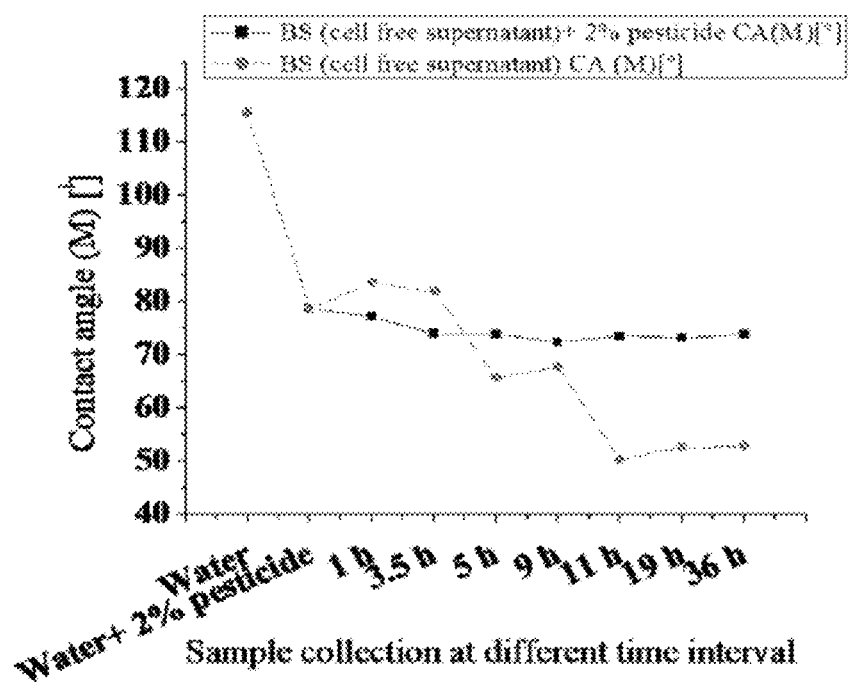
Figure 11B:
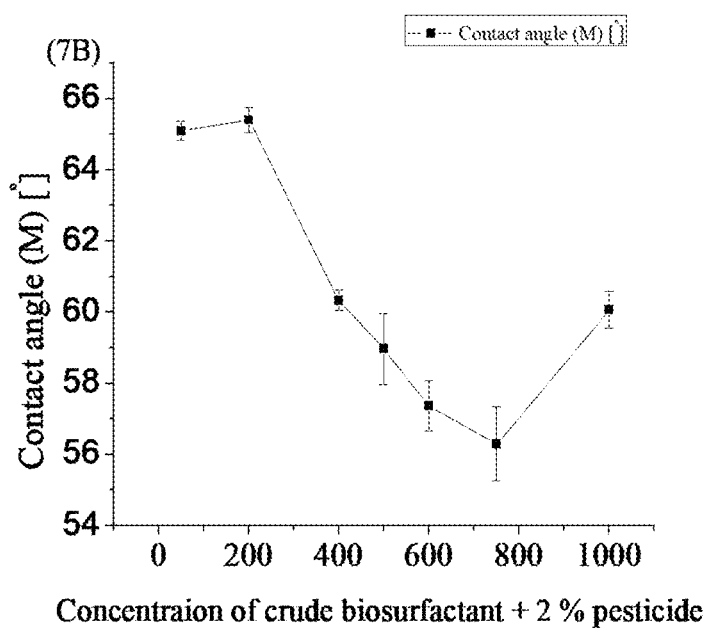

FIG. 11 depicts the contact angle study for droplets of distilled water only, and distilled water and cell free supernatant with and without 2%, Dursban®organophosphate (A). 2%, Dursban®organophosphate pesticide in distilled water (DW) and different concentration of freeze dried biosurfactant (BS) (B).

DETAILS OF BIOLOGICAL RESOURCES USED IN THE INVENTION

The bacterial strain of *Bacillus* sp. MCC0156 was isolated from marine sediment samples collected from the Chorao Island which is located between the Mandovi and Mapusa Rivers in Goa, India. The geographical location of the location is 15° 32'34" latitude and 73°55'15" longitude. Samples were collected from the middle section of the river and from the surface layer of the sediments with a Peterson grab. The central portions of the samples were aseptically transferred to sterile glass bottle and transported to the laboratory for further bacterial isolation by standard serial dilution technique.

DETAILED DESCRIPTION OF THE INVENTION

The invention will now be described in detail in connection with certain preferred and optional embodiments, so that various aspects thereof may be more fully understood and appreciated.

The present invention provides a process for the production and recovery of a bio surfactant mixture consisting of 1-Pentanonacontene and 3-Hydroxy-16-methylheptadecanoic acid from *Bacillus* sp. MCC0156.

The following are the terms that are consistently used in the present invention along with their corresponding definitions:

Crude bio-surfactant: The crude bio-surfactant refers to the freeze dried powder of the acid precipitated pellet obtained in the present process for production and recovery of bio-surfactant from *Bacillus* sp. MCC0156. The crude bio-surfactant comprises 1-Pentanonacontene and 3-Hydroxy-16-methylheptadecanoic acid. Accordingly, the crude bio-surfactant obtained by the present process is also referred to the lyophilized bio-surfactant mixture, and the said terms can be used interchangeably.

Critical Micelle Concentration (CMC): CMC is the minimum concentration of crude bio-surfactant with the maximum reduction of surface tension. The CMC value was calculated by plotting the surface tension versus bio-surfactant concentration.

In a preferred embodiment, the present invention provides a process for the production and recovery of a bio surfactant mixture consisting of 1-Pentanonacontene and 3-Hydroxy-16-methylheptadecanoic acid from *Bacillus* sp. MCC0156 comprises the following steps of:

a) inoculating a culture of *Bacillus* sp. MCC0156 in a medium consisting of yeast extract in water at 30° C. for 12 hours to 24 hours;

b) obtaining cell free supernatant by centrifuging;

c) regulating pH of supernatant of step (b) to 2 using acid and storing overnight at 4° C. to obtain an acid precipitated pellet by centrifugation and dissolving in water adjusted to pH 8;

d) repeating step of acid precipitation of step (c) at least two times to remove impurities from the medium; and e) freeze drying the acid precipitated pellet to obtain a lyophilized bio surfactant mixture consisting 1-Pentanonacontene and 3-Hydroxy-16-methyl heptadecanoic acid.

In an aspect of the present invention, the marine isolates were screened for bio-surfactant production using haemolytic assay, drop collapse test and emulsification assay, which proved that *Bacillus* sp. MCC0156 effectively produced a bio-surfactant mixture with excellent emulsification and oil displacement activity and enhanced oil (ULO and HWCO) recovery.

Figure 1:
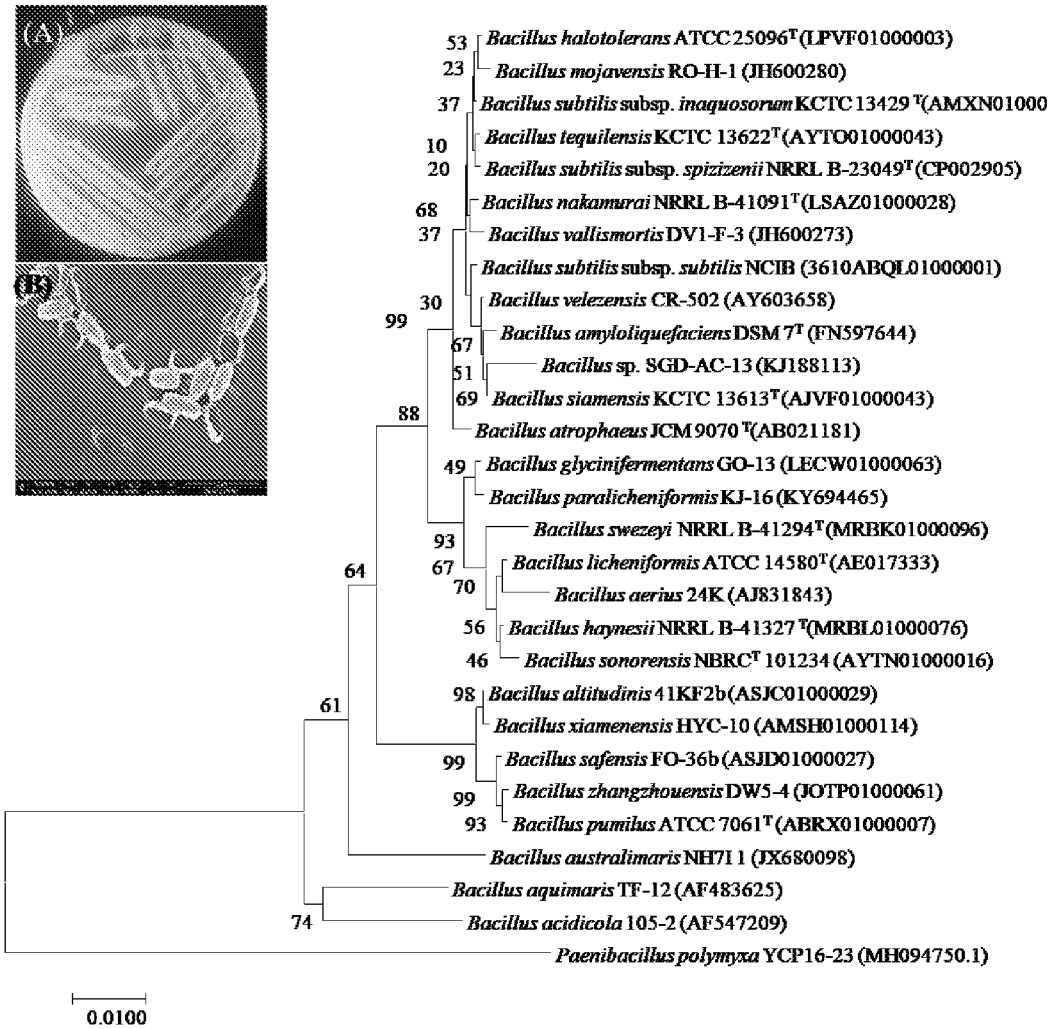

*Bacillus* sp. MCC0156 was characterized using 16S rRNA gene sequence (1515 bp). The obtained 16S rRNA gene sequence was used to BLAST against Ez-taxon database in which it showed the maximum sequence similarity with species members of genus *Bacillus*: *Bacillus velezensis* CR-502 (99.28%); *B. siamensis* KCTC 13613 (99.18%); *B. subtilis* subsp. *subtilis* NCIB 3610 (99.11%). The obtained hits were retrieved and aligned with contig sequence and phylogenetic tree was constructed using maximum likelihood method (FIG. 1). Biochemical characterization of strain MCC0156 showed highest probability with *Bacillus subtilis* (Table. 1). On the basis of 16S rRNA gene sequence and biochemical profiling, the marine strain MCC0156 was designated as *Bacillus* sp. SGD-AC-13 (KJ188113).

In an embodiment, *Bacillus* sp. MCC0156 inoculum from the culture medium used in the process of the present invention is in a concentration ranging from 0.5% to 3% of the volume of the culture medium. The culture medium used is Zobell Marine broth, wherein *Bacillus* sp. MCC0156 is cultivated for a period of 24 hours. More preferably, 1% to 2% of the overnight grown culture of *Bacillus* sp. MCC0156 is inoculated in a medium comprising 0.5% to 5% yeast extract in water at room temperature, i.e. 25° C. to 32° C. at 100 to 200 rpm for 12 hours to 24 hours. Most preferably, 1% of the overnight grown culture of *Bacillus* sp. MCC0156 is inoculated in a medium comprising 1% yeast extract in water at 30° C., 150 rpm for 24 h in 1% yeast extract in water. The aforesaid parameters are applicable to laboratory scale flask culture conditions and fermenter conditions.

In another embodiment, post the incubation period of the *Bacillus* sp. MCC0156 for 12 hours to 24 hours, the culture broth is subjected to centrifugation to obtain a cell free supernatant by centrifuging at 8000 rpm for 20 min.

In yet another embodiment, the present invention provides the process of acid precipitation comprising regulating the pH of the culture supernatant of step (b) of the present process to at least 2.0 using acid and storing overnight at 4° C. to obtain an acid precipitated pellet by centrifugation and dissolving in water adjusted to pH 8. Acid precipitation is performed using 4N hydrochloric acid and used only for pH adjustment from 8.4 to 2.0.

In a further embodiment, the present invention provides a process of repeating acid precipitation of the supernatant in step (c) at least two times to remove impurities from the medium to obtain an acid precipitated pellet which is subjected to freeze drying to obtain a crude bio-surfactant mixture consisting of 1-Pentanonacontene and 3-Hydroxy-16-methyl heptadecanoic acid.

In another preferred embodiment, the present invention provides a process for freeze drying the acid precipitated pellet to obtain a lyophilized bio surfactant mixture consisting of 1-Pentanonacontene and 3-Hydroxy-16-methylheptadecanoic acid. Accordingly, 1-Pentanonacontene is designated as compound 1 and 3-Hydroxy-16-methylheptadecanoic acid is designated as compound 2.

In yet another preferred embodiment, the present invention provides a bio surfactant mixture consisting of 1-Pentanonacontene in a concentration ranging from 60% to 70% by weight of the crude bio-surfactant mixture and 3-Hydroxy-16-methylheptadecanoic acid in a concentration ranging from 30% to 40% by weight of the crude bio-surfactant mixture.

Figure 2:
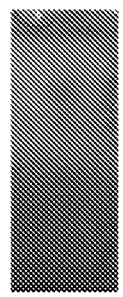
FIG. 2 depicts Thin layer chromatography (silica 60) of crude biosurfactants with n-Butanol:acetic acid:water (3:1.5:1 v/v/v) as mobile phase. p-Anisaldehyde stain was used to develop the dark blue spot of biosurfactant.
Figure 3:
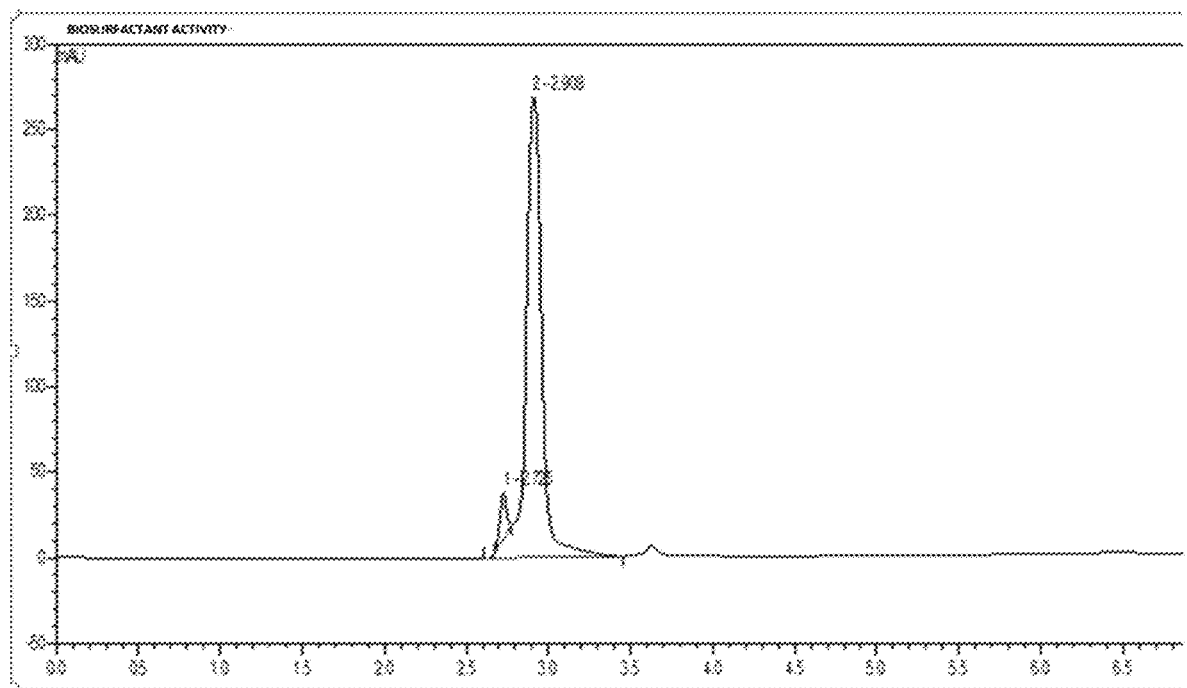
FIG. 3 depicts High performance liquid chromatography of active fractions with oil dispersion activity collected from column chromatography.

The crude bio-surfactant obtained by the process of the present invention was purified by Thin Layer Chromatography (TLC) and High Performance Liquid Chromatography (HPLC) and characterized by NMR to identify compound-1 of Formula I 1-Pentanonacontene, and compound 2-3-Hydroxy-16-methylheptadecanoic acid. (FIGS. 2 and 3 and table 9). The LC-MS spectrum of 1-Pentanonacontene, $C_{95}H_{190}$ (Compound-1) showed a molecular peak at 1333.1882 [M+1] and 3-Hydroxy-16-methylheptadecanoic acid, $C_{18}H_{36}O_3$ (Compound-2) showed molecular peak at 301.1 [M+1].

The chemical formula for compound 1 of Formula I is $C_{95}H_{190}$ and its IUPAC name is 1-Pentanonacontene.

Formula I

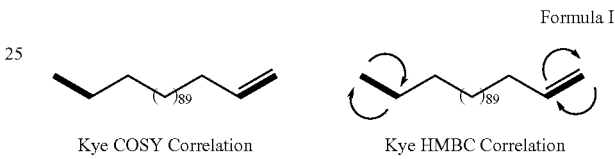

Kye COSY Correlation     Kye HMBC Correlation

In one preferred embodiment, the present invention provides a crude bio-surfactant mixture having a yield of 300 mg/L to 800 mg/L. The culture medium comprising 0.5% to 5% yeast extract in water results in a yield of bio-surfactant in the range of 500 mg/l to 700 mg/l.

In another embodiment, the present invention studies the stability of bio surfactant mixture obtained by the present process over a wide range of temperature, pH and salinity. The stability of bio-surfactants has implications in their valuation during their application in various industries.

The present invention further studies the effect of physiochemical parameters selected from the group consisting of temperature, pH and salinity on surface active properties of bio-surfactants which was assessed by determining the oil displacement and emulsification activity of cell free supernatant obtained from *Bacillus* sp. MCC0156. The Tables 5, 6 and 7 provide stability data of the crude bio-surfactant obtained by the present process.

Figure 4:
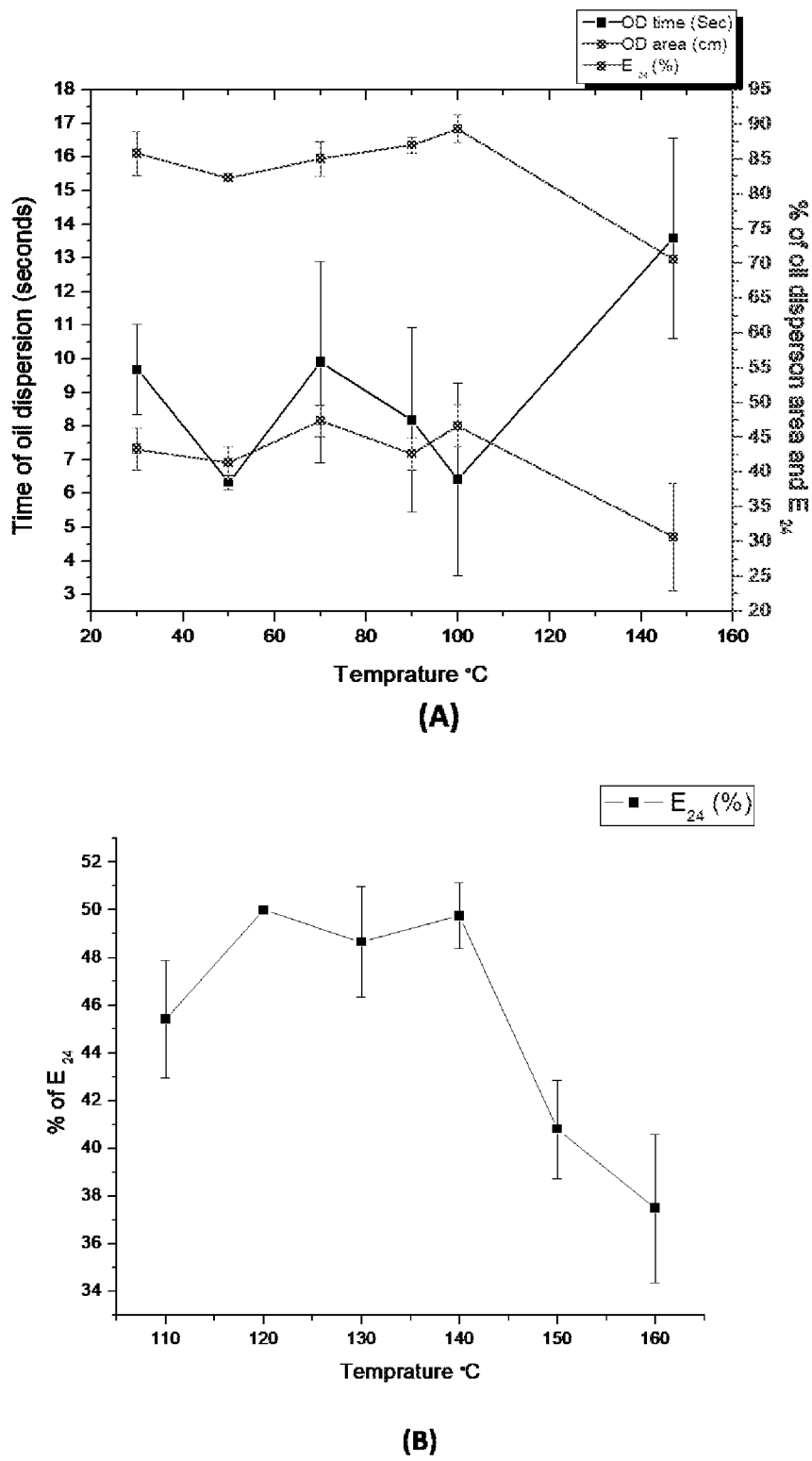
FIG. 4 depicts Effect of temperature on crude biosurfactant from *Bacillus* sp. MCC0156 determined by oil dispersion time (seconds), oil dispersion area (%) and emulsification index ($E_{24}$, %).

The crude bio-surfactant obtained in the present invention, consisting of 1-Pentanonacontene and 3-Hydroxy-16-methylheptadecanoic acid, synthesized using *Bacillus* sp. MCC0156 exhibits stability and activity over a temperature ranging from room temperature i.e. 20-30° C. to 150° C. Accordingly, the results detailed in Table 5 indicate that the emulsification activity of crude bio-surfactant obtained by the present process is maintained at a temperature ranging from 30 to 150° C., both in terms of time for oil dispersion and area of dispersion. In order to determine the thermal stability of the bio-surfactants, cell free supernatant was incubated at different temperatures, in a range selected from 30° C. to 160° C., particularly at 30° C., 50° C., 70° C., 90° C., 100° C. and 147° C. for 30 min and then assessed for emulsification of n-hexane (%), time for oil dispersion (seconds) and area of dispersion (%). The emulsification index of 1-Pentanonacontene was studied, wherein table 6 illustrates the effect of temperature ranging from 100-160° C. on the emulsification of n-Hexane. The bio-surfactant maintained its emulsification over the temperature range and remained stable over this temperature range, as shown in FIG. 4.

The stability of the crude bio-surfactant obtained by the present invention is in the range of 125° C.-130° C. for emulsification activities. This stability emphasizes the thermostable nature of the bio-surfactant mixture obtained by the present invention which is a vital requisite for industries with an operation temperature above 100° C. for emulsification, foaming and detergency applications.

Figure 5:
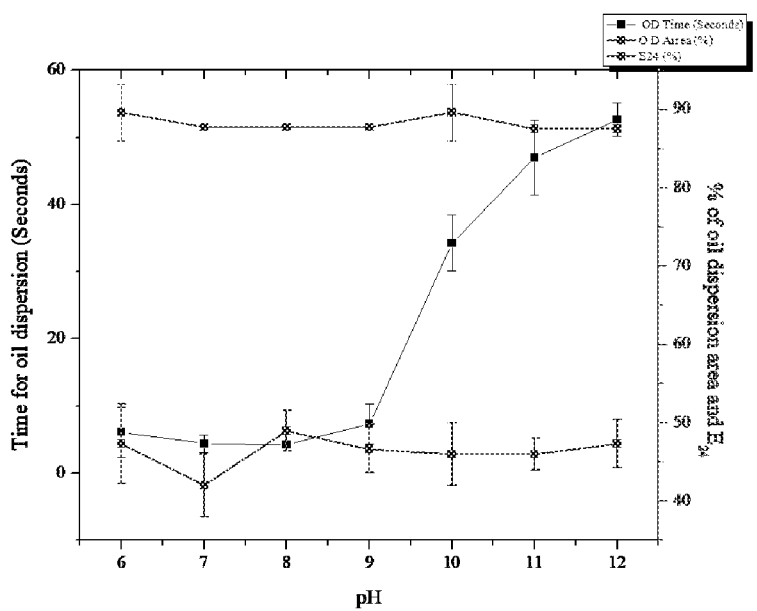
FIG. 5 depicts Effect of pH on crude biosurfactant from *Bacillus* sp. MCC0156 determined by oil dispersion time (seconds), oil dispersion area (%) and emulsification index ($E_{24}$, %).

In an embodiment, the present invention provides the effect of pH on the activity of the crude biosurfactant synthesized from *Bacillus* sp. MCC0156. The bio surfactant maintains its activity of emulsification of n-hexane, time and area of dispersion over a pH range of 6-11. A reference may be made to Table 7 and FIG. 5 describing the stability over pH range of 6-12 for oil displacement and emulsification activity (FIG. 5). Bio-surfactant production at alkaline pH from *Bacillus* sp. MCC0156 and stability over wide range of alkaline pH is of importance in laundry industry.

In one further embodiment, the present invention studies the effect of the concentration of sodium chloride on the performance of the bio surfactant. In an embodiment, the crude bio-surfactant is effective over a salt concentration in the range of 50 g/L to 70 g/L, as shown in table 8 and FIG. 6. The cell free supernatant was found to be stable up to 50 g/L of NaCl in terms of oil displacement and emulsification activity, and therefore the present bio-surfactant mixture even in its crude form is efficient in marine environment for bio-remediation and oil recovery applications.

Figure 7:
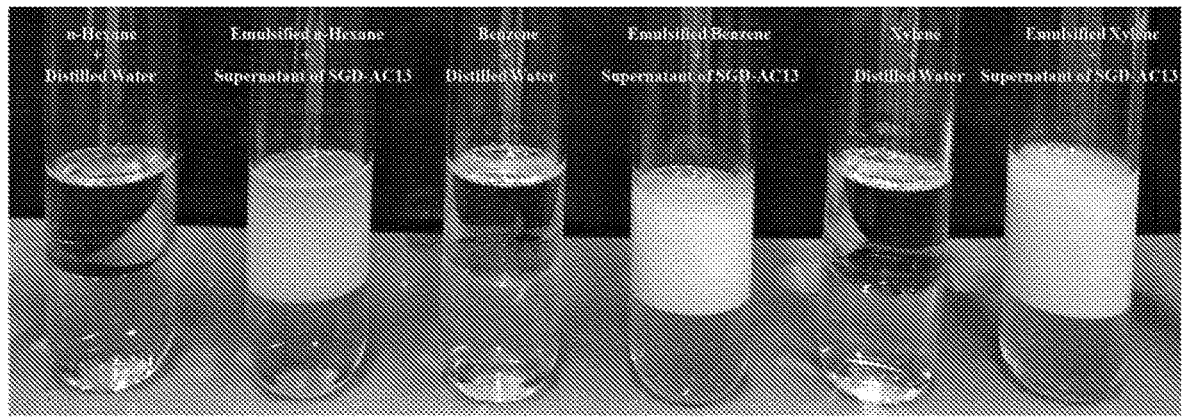
FIG. 7 depicts Emulsification index ($E_{24}$) of cell free supernatant of *Bacillus* sp. MCC0156 for organic solvents.

In a preferred embodiment, the present invention provides an emulsification index of the crude bio-surfactant mixture from *Bacillus* sp MCC0156 which was evaluated for organic solvents selected from hydrocarbons, preferably aliphatic or aromatic, more preferably n-hexane, benzene and xylene, as shown in FIG. 7 and table 8 of the present application.

The crude bio-surfactants were analyzed for oil dispersion (OD), surface tension and emulsification activities. The low CMC value of 0.3 mg/ml for the crude bio-surfactant mixture of the present invention results from mixture of compounds in comparison to a purified single compound. The mixture of compound-1 and 2 were highly active for oil dispersion activity in comparison with compound-1 alone.

The cell free supernatant activity of *Bacillus* sp. MCC0156 was evaluated for oil displacement using lubricant layer on water. The displacement area and displacement time was measured and listed in Table 3 and FIG. 8.

In yet another embodiment, the surface tension of the water decreases with increasing concentrations of the bio surfactant. Table 4 indicates that with increasing bio surfactant concentration, the surface tension decreases. Accordingly, bio-surfactant in concentration from 1-600 ug/ml was evaluated and surface tension decreases over this entire range, as shown in table 4 and FIG. 9. Therefore, the surface tension reduction and critical micelle concentration (CMC) define the efficiency of the present crude bio-surfactant mixture in several industrial applications.

The toxicity of a bio-surfactant is mainly attributed to its long chain fatty alkene nature. In an advantageous embodiment, the present invention provides for the reduced toxicity effect of bio-surfactants of the present invention towards the environment which could be overcome by the microflora of the surrounding habitats by using them as carbon sources to satisfy the metabolic need. *Bacillus* sp. MCC0156 is found to be supportive for the growth of *Pseudomonas aeruginosa* NCIM 2037, *Arthrobacter* sp NCIM 5452 and *Rhodococcus* sp. NCIM 5488 in minimal salt medium with crude bio-surfactant as carbon source.

The wetting behaviour of aqueous solution on hydrophobic surface has been studied with significant importance in wide range of applications such as in agriculture, coating and washing. Due to low wettability of pesticide droplets on plant surface, excess amounts are being used to attain control effect of pesticides in agriculture. Surface active ingredients reduce the surface tension of liquid as well as interfacial tension between liquid-solid interface that results in decreased contact angle of droplets and increased wettability. Accordingly, the present invention provides a crude bio-surfactant mixture having potential to reduce the contact angle of pesticide droplets on hydrophobic surface which would be helpful to reduce the pesticide pollution by decreasing the required amount of it to get control on insects, as shown in table 10 and FIG. 10.

In a preferred embodiment, the present invention provides a microbial composition comprising *Bacillus* sp. MCC0156 in a concentration ranging from 0.5% to 5% by weight of the culture medium and a suitable excipient.

The properties studied for the bio surfactants are used for diverse applications and in various domains. The bio surfactant finds use in formulations of products with ability to disperse oil in the remediation of accidental oil spillages.

In an embodiment, the present invention provides the use of formulations of the crude bio surfactant mixture consisting of 1-Pentanonacontene and 3-Hydroxy-16-methyl heptadecanoic acid in the detergent/laundry industry, agriculture and bio-remediation processes. The contact angle reducing ability of fatty alkene bio-surfactant could make it a candidate to reduce pesticide pollution by reducing the amount of pesticide required to control the insects.

In conclusion, the present invention for the first time provides production of fatty alkene as a bio-surfactant which has not been disclosed for any *Bacillus* spp. The adaptation of the process for the production of bio-surfactant by *Bacillus* sp. MCC0156 enables it to produce certain molecules including bio-surfactants at varying physiological parameters and can be efficiently used in procedures for oil recovery and bio-remediation.

EXAMPLES

The following examples are given by way of illustration only and therefore should not be construed to limit the scope of the present invention in any manner.

Example 1: Isolation and Characterization of Bacterial Strains

Sediment samples were collected from intertidal region of mangroves at Chorao Island, Goa, India. Bacterial strains were isolated by performing serial dilution (0.8% NaCl). Diluted samples were spread plated on nutrient agar plates (g/L) [5.0-peptone; 5.0-NaCl; 1.5-beef extract; 1.5-yeast extract; 15-agar with pH 7.4±0.02, Hi-Media]. Morphologically different colonies were streaked thrice consecutively on nutrient agar plates and pure cultures were maintained at 4° C. Marine bacterial isolates were screened for bio-surfactant production and characterization. Among them, marine isolate MCC0156 was found to be promising, therefore the strain was cultivated in Zobell Marine Broth 2216 (g/L) [5.0-peptone 1.0-yeast extract; 0.10-$C_6H_5FeO_7$; 19.45-NaCl; 8.8-$MgCl_2$; 3.24-$Na_2SO_4$; 1.80-$CaCl_2$; 0.55-KCl; 0.16-$NaHCO_3$; 0.08-KBr; 0.034-$SrCl_2$; 0.022-$H_3BO_3$;

0.004-Na$_2$SiO$_3$; 0.0016-NH$_4$NO$_3$; 0.008-Na$_2$HPO$_4$; 0.0024-NaF; pH 7.6] and nutrient broth. The strain MCC0156 was characterized morphologically through Field-emission scanning electron microscopy (FE-SEM). The overnight grown culture was fixed on glass cover slip then processed for gold coating and scanned at different magnification to captured electron micrographs. The strain was characterized genetically using 16S rRNA gene sequencing using universal primers 27F and 1542R by following PCR protocol: 94° C. for 3 min; 94° C. for 1 min; 60° C. for 30 sec; 72° C. for 2 min; 72° C. for 7 min. The obtained sequences were aligned using multiple sequence alignments and phylogenetic tree was constructed. *Bacillus* MCC0156 was Gram positive and biochemical characterization was performed to determine its biochemical activities.

*Bacillus* MCC0156 was found to be positive for zone of haemolysis on sheep blood agar palate, drop collapse test and emulsification assay and was selected to evaluate bio-surfactant production and characterization. *Bacillus* MCC0156 formed slimy colonies on nutrient agar plates and cell morphology observed under FE-SEM showed short rod shaped (1.32 μm×522.4 nm) (FIGS. 1A and B). The 16S rRNA gene (1515 bp) sequence of strain MCC0156 showed maximum sequence similarity with *Bacillus velezensis* (99.28%); *Bacillus siamensis* KCTC 13613 (99.18%); *Bacillus subtilis* subsp. *subtilis* NCIB 3610 (99.11%). The obtained hits were retrieved and aligned with contig sequence and phylogenetic tree was constructed using neighbour joining method using 1000 bootstrap values of MEGA 7.0 software (FIG. 1). The contig of 16S rRNA gene sequence was submitted to NCBI GenBank with accession number KJ188113. Biochemical characterization of strain MCC0156 showed highest probability with *Bacillus subtilis*. On the basis of 16S rRNA gene sequence and biochemical profiling, the marine strain MCC0156 was designated as *Bacillus* sp. SGD-AC-13.

Example 2: Screening for Bio-Surfactant Production

Marine isolates were screened for biosurfactant production using haemolytic assay, drop collapse test and emulsification assay. The haemolytic activity as preliminary screening for bio-surfactant production was performed through streaking loopful of 24 h old culture on sheep blood agar plates (5%) and incubated at 30° C. for 24 h and observed for zone of haemolysis. In drop collapse assay, cell free supernatant from 24 h broth was used to check drop collapse efficiency and beaded drop was scored "negative" while tween 80 was scored as positive control. In the emulsification assay, cell free supernatant of 24 h old broth was used to determine emulsification efficiency for organic solvents: n-hexane, benzene and xylene. Cell free supernatant (3 ml) was added in 3 ml of n-hexane, benzene, xylene and vortexed vigorously for 2 min and kept overnight at 28° C., and emulsification efficiency was measured using below mentioned formula. For negative control distilled water was used in the place of supernatant with organic solvents.

Emulsification index($E_{24}$)=[height of emulsion layer/total height of liquid]×100%

*Bacillus* MCC0156 showed zone of haemolysis on sheep blood agar plates after incubation at 30° C. for 24 h which provided the indication of bio-surfactant production. The confirmation of biosurfactant production was supported by drop collapse test in which supernatant of 24 h old culture broth made collapse the drop from beaded shape. The cell free supernatant obtained from 24 h incubated culture broth was able to emulsify organic solvents with emulsification index ($E_{24}$): n-hexane (50%), benzene (53%) and xylene (62%) (FIG. 7).

TABLE 2

Emulsification index ($E_{24}$,%) of cell free supernatant of *Bacillus* sp. MCC0156 for organic solvents.

| S. No. | Organic solvent | Emulsification of n-Hexane (%) |
|---|---|---|
| 1 | n-hexane | 50% |
| 2 | Benzene | 53% |
| 3 | Xylene | 62% |

Example 3: Bio-Surfactant Production

Bio-surfactant production by strain MCC0156 was studied using three different media: TY medium (1% yeast extract in tap water), nutrient broth and Zobell marine broth at 30° C., 150 rpm for 24 h in 250 ml Erlenmeyer flask. The laboratory scale of 14 L fermenter equipped with facility for online measurement of dissolved oxygen (DO), pH, agitation and air supply, with working volume of 10 L was used for bio-surfactant production from *Bacillus* MCC0156 using yeast extract (1%) in tap water as production medium. To determine the growth, optical density (OD) at 620 nm was measured using spectrophotometer. Several parameters i.e., DO, pH, agitation, growth rate and air supply was studied to determine biosurfactant production profile of *Bacillus* MCC0156. The fermenter vessel with 9 L TY medium and assemblies were autoclaved at 121° C., 15 psi for 20 min and kept overnight for cooling and sterility checks with sterile air supply for DO saturation of medium. Inoculum of stain MCC0156 was prepared in TY medium by incubating at 30°

TABLE 1

Biochemical profiling of *Bacillus* sp. MCC0156 determined using the BCL card of bioMérieux VITEK ® (VITEK 2 Systems Version: 07.01) showed highest probability with the *Bacillus subtilis* with the following profile:
Biochemical parameters

| 1 BXYL | + | 3 LysA | − | 4 AspA | + | 5 LeuA | + | 7 PheA | + | 8 ProA | − |
|---|---|---|---|---|---|---|---|---|---|---|---|
| 9 BGAL | + | 10 PyrA | + | 11 AGAL | + | 12 AlaA | + | 13 TyrA | + | 14 BNAG | + |
| 15 APPA | − | 18 CDEX | + | 19 dGAL | − | 21 GLYG | + | 22 INO | + | 24 MdG | + |
| 25 ELLM | + | 26 MdX | − | 27 AMAN | − | 29 MTE | + | 30 GlyA | + | 31 dMAN | + |
| 32 dMNE | + | 34 dMLZ | − | 36 NAG | (−) | 37 PLE | + | 39 lRHA | − | 41 BGLU | + |
| 43 BMAN | (+) | 44 PHC | − | 45 PVATE | + | 46 AGLU | + | 47 dTAG | − | 48 dTRE | + |
| 50 INU | + | 53 dGLU | + | 54 dRIB | (−) | 56 PSCNa | + | 58 NaCl 6.5% | + | 59 KAN | − |
| 60 OLD | + | 61 ESC | + | 62 TTZ | + | 63 POLYB_R | + | | | | |

C. at 150 rpm for 24 h. Sterile 9 L TY medium was inoculated with 10% inoculum (with 1 L inoculum). Samples were collected at different intervals to monitor bacterial growth and to test the oil displacement activity to determine the bio-surfactant production. DO, pH, agitation and air demand was recorded every hour to link these parameters with bio-surfactant production. The cascade between dissolved oxygen and agitation was applied to maintain 30% DO throughout the experiment in fermenter. The collected samples were subjected to centrifugation at 7000 rpm for 20 min to obtain the cell free supernatant. The obtained supernatant was used for extraction of bio-surfactants and application for enhancement of wettability and oil recovery. To extract the bio-surfactant, cell free supernatant was acid precipitated by adjusting the pH to 2.0 using 4N HCl and kept at 4° C. overnight. The acid precipitated turbid supernatant was centrifuged at 9000 rpm at 4° C. for 20 min. The obtained pellet was re-dissolved in distilled water and pH was adjusted to 8.0. Again the obtained pellet was dissolved in acid water (pH 2.0) and kept at 4° C. overnight, then processed for third round of acid precipitation and kept for freeze drying. The freeze dried powder was used to determine the yield of crude bio-surfactant.

Laboratory scale flask cultures: In laboratory scale flask cultures, TY medium was found to be significant with high yield of 645 mg/L bio-surfactant in comparison to nutrient broth and Zobell marine broth with yield of 350 mg/L and 400 mg/L respectively. Maximum bio-surfactant production using single medium component in incubation time of 24 h showed robust metabolic nature of Bacillus sp. MCC0156 of the present invention which is advantageous over bio-surfactant production reported in previous studies using complex media with multiple ingredients and longer incubation durations of 72-96 h.

Bio-surfactant production in laboratory scale fermenter: The scale up of bio-surfactant production using Bacillus MCC0156 from 250 ml flask level to laboratory scale fermenter was carried out using TY medium as an economical substrate to compete with synthetic surfactants. Bacillus MCC0156 was found to reach maximum bio-surfactant production at 12 h of fermentation determined using oil displacement assay.

Example 3: Oil Displacement Assay

Modified oil displacement assay was performed to determine the bio-surfactant productivity by measuring the oil displacement area with respect to the time taken to displace. To perform oil displacement assay, 200 μl used lubricant oil (ULO) was added to 50 ml distilled water in glass petri plate that formed layer of 8.5 cm diameter, 20 μl of cell free supernatant was used. The oil displacement area (cm) and displacement time (seconds) was determined and correlated with growth of Bacillus MCC0156. The cell free supernatant obtained from 12 h sample showed maximum oil displacement of 5.5 cm at 22.67 seconds (FIG. 8), wherein maximum oil displacement determined in terms of displacement time (seconds) and displacement area (cm) was achieved. 12 h grown bacterial sample showed the highest bio-surfactant production by Bacillus MCC0156 that was linked with stationary phase of growth curve at alkaline pH 8.46 and with reduced consumption of dissolved oxygen, reduced agitation (rpm) and air supply demand. Therefore, in the present invention, highest bio-surfactant production was achieved in shortest incubation of 12 h in bioreactor in comparison to previous studies with longer incubation time of 24 h.

TABLE 3

Oil displacement assay of cell free supernatant of Bacillus sp. MCC0156 using used lubricant oil layer on distilled water and displacement area with reference to displacement time (seconds)

| Incubation time of bacterial culture used (h) | Displacement time (sec) | Displacement area (cm) |
| --- | --- | --- |
| 1 | 0 | 0 |
| 2 | 0 | 0 |
| 3 | 120 | 1.5 |
| 4 | 120 | 2 |
| 5 | 120 | 1 |
| 6 | 90 | 2 |
| 7 | 60 | 5.5 |
| 8 | 60 | 5 |
| 9 | 60 | 4.2 |
| 10 | 54.41 | 4.5 |
| 11 | 40.97 | 5 |
| 12 | 22.67 | 5.5 |
| 13 | 60 | 2 |
| 14 | 15 | 2 |

Example 4: Fourier Transform Infra-Red Analysis (FTIR)

The chemical characterization of crude bio-surfactant was carried out using FTIR (a Perkins Elmer spectrometer I) analysis. The crude bio-surfactant (2.0 mg) grounded with 200 mg potassium bromide (KBr) was used to prepare pellet to determine the functional groups, using Fourier transform infra-red analysis (FTIR). The IR spectrum for the prepared pellet was recorded in the range of 450-4000 $cm^{-1}$ at the resolution 4 $cm^{-1}$. The analysis of FTIR spectrum revealed the presence of distinct corresponding bands to functional groups at 3290.491 $cm^{-1}$ (stretching of O—H), 2925.88 $cm^{-1}$ (stretching mode of CH bonds), 1656.62 $cm^{-1}$ (O=C bond), 1544.59 $cm^{-1}$ (stretching of C—O bond), 1452.90 $cm^{-1}$ ($CH_3$ or CH bend), 1404.40 $cm^{-1}$ (C=O bond), 1223.41 $cm^{-1}$ (C—O deformation vibrations). The band pattern in FTIR spectrum indicated the presence of functional groups of long chain fatty acids that was consistent to other reports of bio-surfactants.

Example 4: Surface Tension Activity (ST) and Critical Micelle Concentration (CMC)

The surface tension of the crude bio-surfactant was measured using pendent drop technique on optical contact angle goniometer. Axisymmetric Drop Shape Analysis (ADSA) technique was implemented to evaluate surface tension value from the pendent drop image. In the absence of external force like gravity a drop of liquid tends to form a sphere, due to its surface tension. However, if drop size is large than capillary length, gravity predominates and the typical pendent drop shape is formed. Distilled water was used as control to calibrate the system and different concentration of crude bio-surfactant in distilled water was used to study the surface tension. CMC is the minimum concentration of crude biosurfactant with the maximum reduction of surface tension. The CMC value was calculated by plotting the surface tension versus bio-surfactant concentration. The values were taken as average of triplicate of surface tension with standard deviation.

TABLE 4

Surface tension of distilled water with different concentration of crude bio surfactant from *Bacillus* sp. MCC0156.

| Biosurfactant conc. (μg/ml) | Surface tension [mN/m] |
|---|---|
| 0 | 72.25 |
| 25 | 70.08 |
| 50 | 60.97 |
| 100 | 37.64 |
| 200 | 32.49 |
| 300 | 31.32 |
| 400 | 31.19 |
| 500 | 31.62 |
| 600 | 31.63 |

Distilled water used to calibrate the system showed the ST: 71.63±0.073 mN/m. Crude bio-surfactant produced by *Bacillus* sp. MCC0156 reduced the surface tension of water from 71.63±0.073 mN/m to 31.32±0.926 mN/m with CMC of 0.3 mg/ml concentration (FIG. 9). The lowest reduced surface tension 31.32±0.926 mN/m with CMC value of 0.3 mg/ml concentration obtained from crude biosurfactants of *Bacillus* sp. MCC0156 was consistent and comparable to other reported biosurfactants: lipopeptide produced by *Rhodococcus* sp. TW53 which reduced the surface tension of water to 30.7 mN/m with a CMC value of 0.237 mg/ml, biosurfactants from *B. subtilis* CN2 reduced the surface tension to 32 mN/m with CMC value of 0.185±10 mg/ml, Aneurinifactin produced by marine *Aneurinibacillus aneurinilyticus* SBP-11 reduced the surface tension to 26 mN/ml with CMC value of 0.026 mg/ml, examined.

Example 5: Effect of Physiochemical Parameters on Biosurfactants Activity

The effect of physiochemical parameters (temperature, pH and salinity) on surface active properties of bio-surfactants was assessed by determining the oil displacement and emulsification activity of cell free supernatant obtained from strain MCC0156. To determine the thermostability of the biosurfactants, cell free supernatant was incubated at different temperature 30° C., 50° C., 70° C., 90° C., 100° C. and 147° C. for 30 min then assessed for oil displacement of ULO layer and emulsification of n-hexane. Additionally, to study the thermostable emulsifier for industrial processes, emulsification efficiency of cell free supernatant was studied at different temperature 110° C., 120° C., 130° C., 140° C., 150° C., 160° C. and 170° C. The effect of pH on bio-surfactant was studied on cell free supernatant after adjusting pH to 4, 5, 6, 7, 8, 9, 10, 11, 12 and 13 using 1N HCl and 4N NaOH; subsequently used for oil displacement and emulsification activity. The effect of salinity on biosurfactant activity was studied at different concentration of NaCl (50 g/L, 70 g/L and 100 g/L) and obtained cell free supernatant was studied for oil displacement and emulsification activity.

Temperature: Bio-surfactants produced from *Bacillus* sp. MCC0156 showed stability for oil displacement and emulsification activity upto 147° C. (FIG. 4A). However, the cell free supernatant was able to emulsify the n-hexane up to 160° C. but not at 170° C. (FIG. 4A). Thermostable bio-surfactants remained a need for industries with operation temperature above 100° C. for emulsification, foaming and detergency applications, but most of the bio-surfactants produced from bacterial and yeast had showed the stability up to 125-130° C. for emulsification activities.

TABLE 5

Effect of temperature on crude bio-surfactant from *Bacillus* sp. MCC0156 determined by emulsification index ($E_{24}$, %), time for oil dispersion (seconds) and area of oil dispersion (%).

| Temperature (° C.) | Emulsification of n-Hexane (%) | Time for Oil Dispersion (Seconds) | Area of Oil Dispersion (%) |
|---|---|---|---|
| 30 | 43.33 | 9.68 | 85.83 |
| 50 | 41.33 | 6.32 | 82.23 |
| 70 | 47.33 | 9.90 | 85.05 |
| 90 | 42.66 | 8.18 | 87.05 |
| 100 | 46.66 | 6.41 | 89.40 |
| 147 | 30.66 | 13.59 | 70.58 |

TABLE 6

Effect of temperature on crude biosurfactant from *Bacillus* sp. MCC0156 on emulsification index ($E_{24}$, %).

| Temperature (° C.) | Emulsification of n-Hexane (%) |
|---|---|
| 110 | 45.42 |
| 120 | 50.00 |
| 130 | 48.66 |
| 140 | 49.75 |
| 150 | 40.80 |
| 160 | 37.48 | pH: The cell free supernatant showed stability over pH range of 6-12 for oil displacement and emulsification activity (FIG. 5). Bio-surfactant production at alkaline pH from marine isolates and stability over wide range of alkaline pH provides opportunities to explore application in laundry industry. The bio-surfactant from *Bacillus* sp. MCC0156 was found consistent with bio-surfactants of microorganism origins with stability over pH 6-12.

TABLE 7

Effect of pH on crude biosurfactant from *Bacillus* sp. MCC0156 determined by emulsification index of n-Hexane ($E_{24}$, %), time for oil dispersion (seconds), area of oil dispersion (%)

| pH | Emulsification of n-Hexane (%) | Time for Oil Dispersion (Seconds) | Area of Oil Dispersion (%) |
|---|---|---|---|
| 6 | 47.33 | 6.10 | 89.58 |
| 7 | 42.00 | 4.42 | 87.74 |
| 8 | 49.00 | 4.23 | 87.74 |
| 9 | 46.66 | 7.37 | 87.74 |
| 10 | 46.00 | 34.29 | 89.58 |
| 11 | 46.00 | 47.00 | 87.50 |
| 12 | 47.33 | 52.66 | 87.50 |

Figure 6:
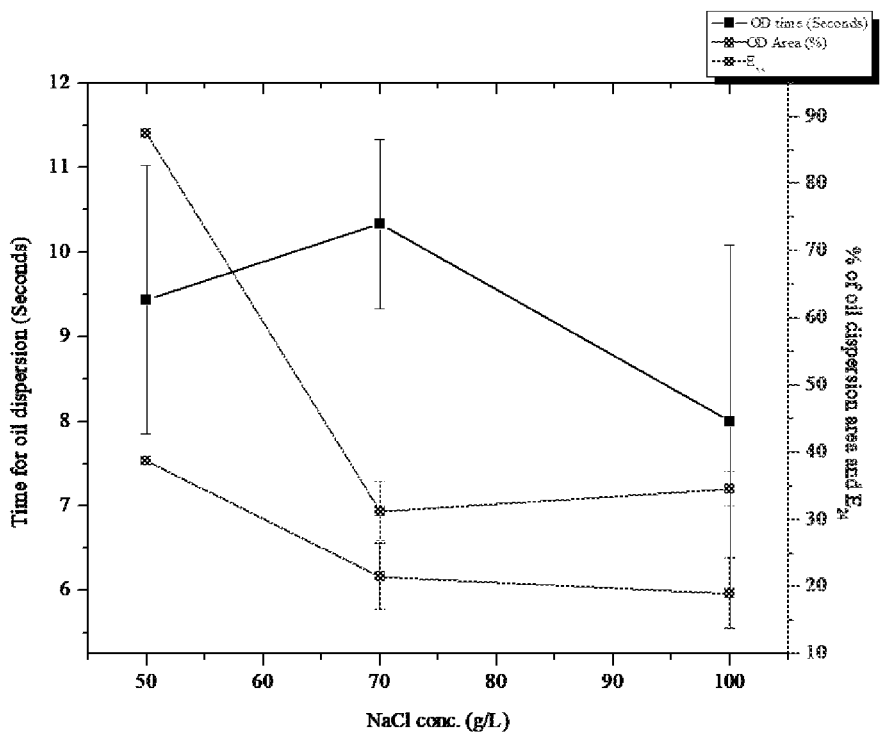
FIG. 6 depicts Effect of NaCl concentration on crude biosurfactant from *Bacillus* sp. MCC0156 determined by oil dispersion time (seconds), oil dispersion area (%) and emulsification index ($E_{24}$, %).

Salinity: The cell free supernatant was found to be stable up to 50 g/L of NaCl in terms of oil displacement and emulsification activity (FIG. 6). The highest oil displacement and emulsification activity observed at 50 g/l of NaCl indicated its efficient application in marine environment for bioremediation and oil recovery applications. Biosurfactants from other bacterial and yeast species have been reported with saline stability over wide range of NaCl concentration up to 20% with emulsification activity.

TABLE 8

Effect of NaCl concentration on crude biosurfactant from Bacillus sp. MCC0156 determined by emulsification of n-Hexane (%), time for oil dispersion (Seconds) and area of dispersion (%)

| NaCl Con (g/L) | Emulsification of n-Hexane (%) | Time for Oil Dispersion (Seconds) | Area of Dispersion (%) |
|---|---|---|---|
| 50 | 38.70 | 9.43 | 87.50 |
| 70 | 21.50 | 10.33 | 31.25 |
| 100 | 19.00 | 8.00 | 34.58 |

The bio-surfactant from *Bacillus* sp. MCC0156 using economical raw material with thermostability up to 160° C., over wide pH range of 6-12 and 50% NaCl concentration was found advantageous over the previous reported bio-surfactants with wide application potential.

Example 6: Column Chromatography for Purification of Bio-Surfactant

The crude bio-surfactant was dissolved in methanol and mixed with silica (mesh size 60-120) and dried using rotary-evaporator and used for bed formation above the matrix of silica (mesh size 100-200) in column. The gradient of DCM:MeOH (Dichloromethane:Methanol) was used as mobile phase for elution, initially 100% DCM was used and it was followed by five percentage increase of MeOH to obtain different fractions of 25 ml. The solvent from each collected fraction was evaporated using rotary-evaporator and residual compounds were dissolved in water and examined for purity on thin layer chromatography and for oil displacement activity to confirm the bio-surfactant properties.

During column chromatography, three fractions eluted with gradient of dichloromethane and methanol (55:45-50:50) and (40:60) showed oil displacement activity. The fractions eluted with gradient of DCM:MeOH (55:45-50:50) were pooled together and considered as fraction I and DCM:MeOH (40:60) was considered fraction II. The solvents from these active fractions were evaporated using rotary-evaporator at reduced vacuum at 40° C. and residual compounds were dissolved in water. The active fractions were spotted on silica plates (silica gel 60 $F_{254}$, Merck KGaA). The fraction I was run using mobile phase n-Butanol:acetic acid:water (3:1.5:1 v/v/v) and developed using p-Anisaldehyde stain in single dark blue colour spot and Fraction II (40:60, DCM:MeOH) was run using mobile phase Dichloromethane:methanol (90:10) and developed using phosphomolybdic acid in single dark blue spot.

Example 7: Thin Layer Chromatography (TLC) and High Performance Liquid Chromatography (HPLC)

Different fractions eluted with gradient of Dichloromethane:methanol were used to perform TLC using silica plate (silica gel 60 $F_{254}$, Merck KGaA) with mobile phases containing n-Butanol:acetic acid:water (3:1.5:1 v/v/v) and dichloromethane:methanol (90:10). The plate was kept for drying and sprayed with p-Anisaldehyde and phosphomolybdic acid and developed at 110° C. The active fractions collected from column chromatography were analysed by HPLC with UV detector system at 210 nm using C18-reverse phase column (250×4.6 mm, 5μ). Gradient of water:acetonitrile 80:20, 0 min; 00:100, 20 min, 00:100, 23 min and 80:20, 23-25 min were used as mobile phase. The fraction with more than one peaks were further purified using semi preparative HPLC using C-18 reverse phase column (YMC-Pack ODS-A, 250×10.0 mm I.D, S-15 μm) using the same mobile phase.

Example 9: Nuclear Magnetic Resonance Spectroscopy (NMR) and Liquid Chromatography-Mass Spectroscopy (LC-MS)

The spectral data of purified compounds was recorded on Bruker 400 MHz Avance II. The nuclei frequency 400 MHz was used for $^1$H NMR, and 100 MHz for $^{13}$C NMR. All Chemical shifts (δ) are reported in parts per million downfield from tetramethylsilane (0.00 ppm) as internal standard in $CDCl_3$ (Deuterated chloroform) (7.27 ppm for $^1$H and 77.00 ppm for $^{13}$C) as reference solvent was purchased from Merck. Mass spectrums of compounds were recorded on Liquid chromatography-mass spectroscopy. The C18 column (4.6×75 mm, 2.7 μm) was used with methanol as mobile phase in positive mode using 6120 quadrupole. Structural elucidation of two active compounds from fraction I and II was confirmed by 1D and 2D NMR spectroscopy experiments and identified as a fatty alkene 1-Pentanonacontene, $C_{95}H_{190}$ (Compound-1) and 3-Hydroxy-16-methylheptadecanoic acid, $C_{18}H_{36}O_3$ (Compound-2). The key correlation peaks of carbon in COSY and HMBC experiment for both compounds was studied (FIG. 5). Further, LC-MS spectrum of 1-Pentanonacontene, $C_{95}H_{190}$ (Compound-1) showed a molecular peak at 1333.1882 [M+1] and 3-Hydroxy-16-methylheptadecanoic acid, $C_{18}H_{36}O_3$ (Compound-2) showed molecular peak at 301.1 [M+1]. The bio surfactant was characterized by TLC, HPLC and NMR and was identified as 1-Pentanonacontene, as shown in example 1, FIGS. 2 and 3 and table 9.

TABLE 9

$^1$H and $^{13}$C (500, 125 MH$_z$) NMR spectroscopic data for compound in $CDCl_3$ (δ in ppm)

| Position | $^\delta$C, type | $^\delta$H, type |
|---|---|---|
| 1 | 139.28 (CH) | 5.83 (m, 1H) |
| 2 | 114.06 (CH$_2$) | 4.96 (dd, 70.9, 10.99 Hz, 2H) |
| 3 | 34.73 (CH$_2$) | 2.03 (q, 2H) |
| 4 | 31.16 (CH$_2$) | 1.68 (m, 2H) |
| 5 | 29.35 (CH$_2$)$_{89}$ | 1.30 (m, 178H) |
| 6 | 22.68 (CH$_2$) | 1.26 (m, 2H) |
| 7 | 14.12 (CH$_3$) | 0.85 (t, 8Hz, 3H) |

Example 9: Study of Surfactant Properties of Purified Compounds

The purified compounds from the crude biosurfactants were analyzed for oil dispersion (OD), surface tension and emulsification activities using the standard protocols as mentioned in methodology. The purified compound-1 showed the oil dispersion, surface tension and emulsification activity, while the compound-2 found not active for surface properties. The compound-1 (1-Pentanonacontene, $C_{95}H_{190}$) with retention time 2.820 min decreased the surface tension of distilled water 71.41±0.069 mN/m to 28.53±0.02 mN/m and 40% $E_{24}$ for n-hexane and 93.75% oil dispersion efficiency. The low CMC value 0.3 mg/ml for crude biosurfactant results from mixture of compounds in compare to purified single compound. The mixture of compound-1 and 2 were highly active for oil dispersion activity in comparison with compound-1 alone.

Example 10: Determination of Bio-Surfactants Toxicity and Biodegradability

The toxicity of bio-surfactants on microcrustacean *Artemia salina* was performed in artificial sea water with 30 g/L (w/v) NaCl. Different concentrations like, 10 μg/ml, 100 μg/ml and 1000 μg/ml of crude bio-surfactant and purified compound-1 was supplemented in artificial sea salt solution (pH 8.0) and inoculated with 20 numbers of micro-crustacean *A. salina* in 10 ml per tube of solution and incubated for 24 h at 28° C. under artificial light condition.

The toxicity of bio-surfactants was determined by calculating the mortality rate against the control (in triplicate) after 24 h incubation. The effect of biosurfactants on the microorganisms was studied in minimal salt medium (MSM) to determine the utilization or degradation pattern of bio-surfactant in presence of *Pseudomonas aeruginosa* NCIM 2037, *Arthrobacter* sp NCIM 5452 and *Rhodococcus* sp NCIM 5488. The minimal salt medium was supplemented with 100 ppm of crude biosurfactant and inoculated with all three strains and incubated at 30° C., 150 rpm for 72 h. Effect of biosurfactants on growth of test strains were determined through measuring the optical density at 620 nm after incubation of 72 h.

The crude bio-surfactants produced by *Bacillus* sp. MCC0156 showed 58% and 60% mortality at 10 and 100 μg/ml concentrations to the micro-crustacean *Artemia salina*. The purified compound-1 (1-Pentanonacontene, $C_{95}H_{190}$) showed 59% and 61% mortality at 10 and 100 μg/ml concentrations to the micro-crustacean *Artemia salina*. Both crude and purified bio-surfactant showed 80% and 68% mortality respectively at 1000 ug/ml concentration to *Artemia salina*.

The present toxicity level of bio-surfactant produced by *Bacillus* sp. MCC0156 against *Artemia salina* is attributed to its long chain fatty alkene nature. The toxicity effect of bio-surfactants for other organisms could be overcome by the microorganism of the surrounding habitats by using them as carbon sources to fulfill the metabolic need. The bio-surfactant produced by *Bacillus* sp. MCC0156 was found to be supportive for the growth of *Pseudomonas aeruginosa* NCIM 2037, *Arthrobacter* sp NCIM 5452 and *Rhodococcus* sp NCIM 5488 in minimal salt medium with crude bio-surfactant as carbon source. The toxicity and biodegradability prospect of biosurfactants produced by *Bacillus* sp. MCC0156 with physiological stability over wide range of environmental condition was found consistent with the previous reports on other bio-surfactants.

Example 11: Wettability of Bio-Surfactant (Cell Free Supernatant) and its Application for Enhanced Pesticide Wetting Wetting ability of cell free supernatant and crude bio-surfactant was studied by measuring the contact angles on Teflon AF (1600) surface using sessile drop method on optical contact angle 15. Distilled water droplet on Teflon surface was taken as control and cell free supernatant collected in time interval was used to determine the contact angle. The cell free supernatant and different concentrations of crude bio-surfactants with 2%, Dursban® organophosphate pesticide were studied for contact angle reduction on Teflon mounted on glass slide. D/w with 2%, Dursban®organophosphate pesticide was used as control on teflon.

Cell free supernatant obtained at 12 h of incubation reduced the contact angle from 117° to 52.28° of distilled water droplet on Teflon tap (FIG. 11A). The contact angle of 2% Dursban®organophosphate pesticide droplet in distilled water was determined 78.77° that was reduced to 73.42° in cell free supernatant of 12 h incubation (FIG. 11A). Further, the contact angles for droplets of 2% pesticide in distilled water and 100% pesticide were almost similar. Because during pesticide formulations, chemically synthetic surfactants are being used to enhance their solubility in water that results in contact angle reduction. The diluted pesticide solutions are being applied in fields which have high contact angle and less wettability. Cell free supernatant reduced the contact angle 5° for 2% pesticide droplet. Contact angle reduction was studied using different concentrations of crude biosurfactants. A concentration of 750 μg/ml of crude biosurfactant showed decrease in contact angle from 66.06° to 56.33° on Teflon surface coated on glass slide (FIG. 10B). The contact angle reduction efficiency of bio-surfactant isolated from *Bacillus* sp. MCC0156 could be used to enhance wetting ability of pesticide droplets on plant leaves. Therefore, this can result in reducing the amount of pesticide used in agriculture without compromising its efficiency.

TABLE 10 (A)

Contact angle of distilled water and cell free supernatant of harvested at different time on Teflon and (B) Contact angle of distilled water, distilled water with 2% pesticide and cell free supernatant of harvested at different time.

|  | BS (cell free supernatant) CA (M)[°] | BS (cell free supernatant) + 2% pesticide CA(M)[°] |
|---|---|---|
| Water | 115.58 | 115.58 |
| Water + 2% pesticide | 78.77 | 78.77 |
| 1 h | 83.61 | 77.32 |
| 3.5 h | 81.78 | 74.12 |
| 5 h | 65.68 | 73.9 |
| 9 h | 67.62 | 72.35 |
| 11 h | 50.19 | 73.42 |
| 19 h | 52.55 | 73.24 |
| 36 h | 52.82 | 73.93 |

Example 12: Enhanced Oil (ULO and HWCO) Recovery with Biosurfactant (Cell Free Supernatant)

To study the oil mobilization efficiency, 45 ml cell free supernatant of MCC0156 obtained after incubation of 24 h at 28° C., 150 rpm was used to wash the sand contaminant with 5% ULO. The synthetic contaminant soil was prepared by using the sand collected from the sea shore, Goa, India. The sand was sieved to remove large particles and mixed with 10 ml n-hexane containing 2.5 ml used lubricant oil and crude oil (Procured from local market) and kept for overnight shaking to get homogeneous mixture. The obtained contaminated soil was kept overnight at 70° C. for complete evaporation of n-hexane and kept at room temperate for 10 days to get saturation of sand with used lubricant oil and heavy crude oil, separately. Afterwards, the contaminated sand was washed with 45 ml of cell free supernatant of strain MCC0156 by incubating at 28° C. at 100 rpm for 30 minutes. In control, contaminated sand was washed with 45 ml TY broth in place of cell free supernatant. After incubation, the flasks were kept for separation of aqueous phase from soil. The aqueous phases were extracted separately with 45 ml n-hexane to determine the used lubricant oil. The solvent was evaporated in pre-weighed round bottom flask using rotary evaporator at reduced vacuum.

$$\text{Percentage of mobilization}: \frac{\text{Weight of oil in control} - \text{weight of oil in treated}}{\text{Weight of oil used initially}}$$

Weight of Oil in control=Oil in the aqueous phase of TY extracted with n-hexane.

Weight of Oil in treated=Oil in the aqueous phase of cell free supernatant of MCC0156 extracted with n-hexane.

Weight of Oil used initially=total of Oil in both aqueous as well as soil of in the treated Cell free supernatant of strain MCC0156 showed promising oil recovery from contaminated sand as it was able to recover 35% of ULO and 12% of HWCO in comparison to aqueous phase of TY medium only. Hence, it proves that the presence of biosurfactant reduced the interfacial tension between cell free broth and oil adsorbed on soil particles. Bio-surfactants produced from natural source using an economical substrate have an advantage over chemically synthetic surfactant for use in oil recovery and bioremediation applications. Bio-surfactants from bacterial origin have been reported for recovery and remediation of crude oil and used/waste lubricant oils. Bio-surfactant from marine isolate *Bacillus* sp. MCC 0156 was found to have comparable potential with biosurfactants from *Bacillus subtilis* with 24%, *Bacillus subtilis* CN2 with 85%, *Wickerhamomyces anomalus* CCMA 0358 with 20% oil recovery.

Advantages of the Invention

The crude bio-surfactant recovered by the present process is a novel, thermostable and efficacious bio surfactant.

The process of production and recovery of the crude bio-surfactant employs economical raw material and involves a short duration of 12 hours to 24 hours.

The culture medium uses Yeast extract (Rs. 2.8/gm) in tap water with incubation time of 12 hours in bioreactor, which is cost effective in comparison to other reports with complex medium and longer incubation time of 24 hours and more.

The use of single component as nutrient source and tap water along with short incubation time reduces the production cost incurred for production of thermostable bio-surfactants.

The bio-surfactant is stable over wide range of temperature, pH and salinity.

The bio-surfactants produced from natural source using economical substrate have an advantage over chemically synthetic surfactant for use in oil recovery and bioremediation applications.

We claim:

1. A process for production and recovery of a bio surfactant mixture consisting of 1-pentanonacontene and 3-hydroxy-16-methyl heptadecanoic acid from *Bacillus* sp. MCC0156 comprising the following steps:
    a) inoculating inoculum from overnight grown culture of *Bacillus* sp. MCC0156 in a medium consisting of yeast extract in water;
    b) obtaining a cell free supernatant by centrifuging;
    c) regulating pH of the cell free supernatant of step (b) to 2.0 using an acid and storing overnight at 4° C. to obtain an acid precipitated pellet by centrifugation and dissolving in water, and adjusting to pH of 8.0;
    d) repeating step of acid precipitation of step (c) at least two times to remove impurities from the medium to obtain a crude bio-surfactant mixture; and
    e) freeze drying the acid precipitated pellet to obtain a lyophilized bio surfactant mixture consisting of 1-pentanonacontene and 3-hydroxy-16-methyl heptadecanoic.

2. The process as claimed in claim 1, wherein the inoculum of *Bacillus* sp. MCC0156 is added at a concentration in a range of 0.5% to 3.0% of a volume of the culture medium.

3. The process as claimed in claim 1, wherein *Bacillus* sp. MCC0156 is inoculated in a medium consisting of 0.5% to 5.0% yeast extract in water.

4. The process as claimed in claim 1, wherein *Bacillus* sp. MCC0156 is inoculated at a temperature ranging from 25° C. to 32° C. at an rpm of 100 to 200 for 12 hours to 24 hours.

5. The process as claimed in claim 1, wherein the bio surfactant mixture consists of 1-pentanonacontene in a concentration ranging from 60% to 70% and 3-hydroxy-16-methyl heptadecanoic acid in a concentration ranging from 30% to 40% by weight of the crude bio-surfactant mixture.

6. The process as claimed in claim 1, wherein acid precipitation is performed using 4N hydrochloric acid for pH adjustment from 8.4 to 2.0.

7. The process as claimed in claim 1, wherein the freeze dried bio surfactant mixture is further subjected to purification by chromatography.

* * * * *